(12) United States Patent
Nakamura et al.

(10) Patent No.: US 7,246,107 B2
(45) Date of Patent: Jul. 17, 2007

(54) SYSTEM AND METHOD FOR CREATING A DATA FILE FOR USE IN SEARCHING A DATABASE

(75) Inventors: Toshiyuki Nakamura, Fujisawa (JP); Fumihiko Terui, San Jose, CA (US)

(73) Assignee: International Business Machines Corporation, Armonk, NY (US)

(*) Notice: Subject to any disclaimer, the term of this patent is extended or adjusted under 35 U.S.C. 154(b) by 501 days.

(21) Appl. No.: 10/755,012

(22) Filed: Jan. 8, 2004

(65) Prior Publication Data

US 2004/0143574 A1 Jul. 22, 2004

(30) Foreign Application Priority Data

Jan. 10, 2003 (JP) ............................ 2003-004572

(51) Int. Cl.
*G06F 7/00* (2006.01)
(52) U.S. Cl. ............................................. 707/1; 707/3
(58) Field of Classification Search ................ 707/1–6
See application file for complete search history.

(56) References Cited

U.S. PATENT DOCUMENTS 5,978,795 A * 11/1999 Poutanen et al. ............. 707/3
6,094,649 A * 7/2000 Bowen et al. ................. 707/3
6,195,654 B1 * 2/2001 Wachtel ......................... 707/3
6,978,263 B2 * 12/2005 Soulanille ...................... 707/3
2002/0073080 A1 * 6/2002 Lipkin ........................... 707/3
2002/0188587 A1 * 12/2002 McGreevy ..................... 707/1

FOREIGN PATENT DOCUMENTS

| JP | 08-241332 | 9/1996 |
| JP | 09-091305 | 4/1997 |
| JP | 09-114856 | 5/1997 |
| JP | 10-293764 | 11/1998 |
| JP | 10-307840 | 11/1998 |
| JP | 11-053400 | 2/1999 |

* cited by examiner

*Primary Examiner*—Wilson Lee
(74) *Attorney, Agent, or Firm*—Samuel A. Kassatly (57) ABSTRACT

An index file for use in search processing employing a search engine, retains information that indicates a correspondence of a keyword to its positional information. The index file comprises a key file that includes a list of pointers to character strings. The character strings are included in document files that are stored in a document database and to positional information, by document area where a character string in a document file appears and a POS file. The POS file includes a list of positional information containing information that specifies a document file where a character string exists and information that specifies a position of the character string in a document file regarding the character strings in the key file.

12 Claims, 7 Drawing Sheets

SYSTEM AND METHOD FOR CREATING A DATA FILE FOR USE IN SEARCHING A DATABASE

PRIOITY CLAIM

The present application claims the priority of Japanese patent application, Ser. No. 2003-004572, titled "Database Search System, Search Method Therefor, Method of Creating Data File for Use in Search, and Recording Medium Storing Data File," which was filed on Jan. 10, 2003, and which is incorporated herein by reference.

1. Field of the Invention

The present invention generally relates to a database search technique, and more particularly to a technique for searching a document database storing a structured document file.

2. Background Art

Databases using computers have been widespread today. They vary in size, including a single computer searching its storage to retrieve stored data, and a search service for searching for document files and content residing on networks such as the Internet.

In a structured document file, such as an HTML document used for a web page on the Internet, a particular document area (referred to as a field hereafter) in the document file may be defined by tags or other means. A document file may be created with different fields such as "title", "header", and "body." When a document database storing such document files is searched with a specific character string used as a search term, the search is not limited simply to a document file containing the character string but may be directed to a document file containing the character string in a specific field.

Conventionally, in search systems for performing a search involving a field search for such a structured document file, information (indices) for searching for a document file containing a search term is stored separately from information on fields in each document file. During a search, both information items are matched to search for a document file containing a search term in a desired field. That is, this requires searching for all document files containing the search term first, and then selecting those that contain the character string in the desired field; therefore the search takes a long time.

What is therefore needed is a system, a software program product, and an associated method for providing quick search processing in a document database search involving a field search.

SUMMARY OF THE INVENTION

The present invention for achieving the above object is implemented as a database search system comprising: a document database; a database control unit for controlling transfer of a document file to or from the document database; a search engine; and a data file for use in a search process performed by the search engine and for retaining information indicating a correspondence between a keyword and positional information on the keyword, said information being retained separately for each document area containing the keyword in the document file.

The database system may be implemented in a single computer or implemented by distributing functions among a plurality of computers connected over a network. The data file retains, as the positional information on the keyword, information that specifies a document file containing the keyword and information that specifies a position of the keyword in the document file, each item of the positional information being associated with a corresponding item of the keyword listed as separate items for respective document areas.

More specifically, the data file comprises: a first table that lists character strings contained in a document file stored in the document database and pointers to positional information on the character strings, each character string being listed as separate items for respective document areas where the character string appears in the document file; and a second table that lists positional information on each of character strings including the character strings listed in the first table and including character strings that do not belong to any document areas, said positional information including information that specifies a document file containing the character string and information that specifies a position of the character string in the document file.

The present invention for achieving the above object is also implemented as a database search method of searching a document database for a desired document file by using a computer, comprising: a first step of inputting a search expression, said search expression including a search term made up of a given character string and also including field information specifying a document area where the search term appears in the document file; a second step of referencing a data file stored in a given memory, locating a keyword corresponding to the search expression including the field information, and acquiring information specifying a document file containing the located keyword, said data file retaining information indicating a correspondence between information specifying a document file containing a keyword made up of a given character string and the keyword, and said information being retained separately for each document area containing the keyword in the document file; and a third step of outputting the information acquired by referencing the data file as a search result.

The present invention is further implemented as a method of creating a data file for use in searching a document database for a desired document file, comprising: a first step of reading a document file from the document database and extracting a text in the document file and information indicating a structure of the document file (specifically, information indicating a position of a tag written in the document file, for example); a second step of dividing the text into keywords made up of constituent character strings of the text; and a third step of creating a data file based on information indicating the structure of the document file and storing it in a memory, said data file retaining information indicating a correspondence between a keyword and positional information on the keyword, and said information being retained separately for each document area containing the keyword in the document file.

The present invention may also be implemented as a program for controlling a computer to cause the computer to provide the functions of the above described database search system, or to cause the computer to execute processing corresponding to the steps of the above described database search method or method of creating a data file (index file). The program may be provided by distributing in the form of a magnetic disk, optical disk, semiconductor memory, or other recording media, or by distributing over a network.

BRIEF DESCRIPTION OF THE DRAWINGS

The various features of the present invention and the manner of attaining them will be described in greater detail with reference to the following description, claims, and drawings, wherein reference numerals are reused, where appropriate, to indicate a correspondence between the referenced items, and wherein:

FIG. 3 is comprised of FIGS. 3A and 3B, and shows transfer of data between a database control unit and a search engine according to an embodiment of the present invention;

DETAILED DESCRIPTION OF PREFERRED EMBODIMENTS

The present invention will be described with reference to an exemplary embodiment illustrated in the appended drawings.

While databases vary in size and configuration, this embodiment will be described for an exemplary database search system configured with a single computer in which application program with database capability and a search engine for searching the database operate.

Figure 1:
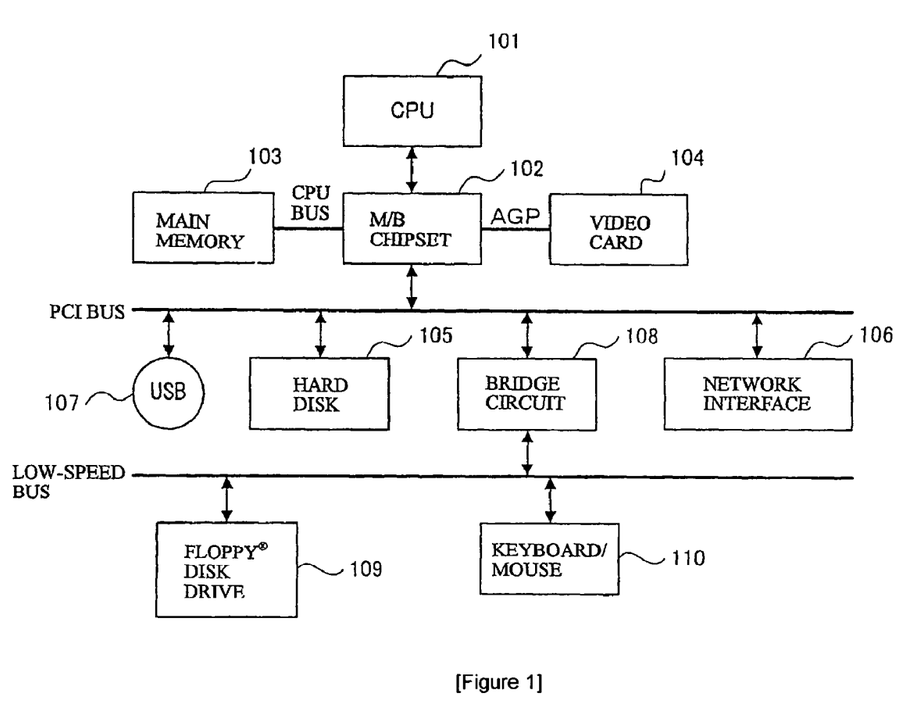
FIG. 1 schematically shows an exemplary hardware configuration of a computer for implementing a database search system according to an embodiment of the present invention.

FIG. 1 schematically shows an exemplary hardware configuration of a computer for implementing the database search system according to this embodiment.

The computer shown in FIG. 1 includes a CPU (Central Processing Unit) 101 as operation means; main memory 103 connected to the CPU 101 via a M/B (motherboard) chipset 102 and a CPU bus; a video card 104 also connected to the CPU 101 via the M/B chipset 102 and an AGP (Accelerated Graphics Port); a hard disk 105, a network interface 106, and a USB port 107 connected to the M/B chipset 102 via a PCI (Peripheral Component Interconnect) bus; and a floppy disk drive 109 and a keyboard/mouse 110 connected to the M/B chipset 102 via the PCI bus, a bridge circuit 108, and a low-speed bus such as an ISA (Industry Standard Architecture) bus.

FIG. 1 is a mere illustration of a hardware configuration of the computer for implementing this embodiment, and various other configurations are possible as long as this embodiment can be applied to them. For example, the computer may be provided with only video memory instead of the video card 104, in which case the CPU 101 processes image data. The computer may also be provided with a CD-ROM (Compact Disc Read Only Memory) drive or a DVD-ROM (Digital Versatile Disc Read Only Memory) drive via an interface such as ATA (AT Attachment).

Figure 2:
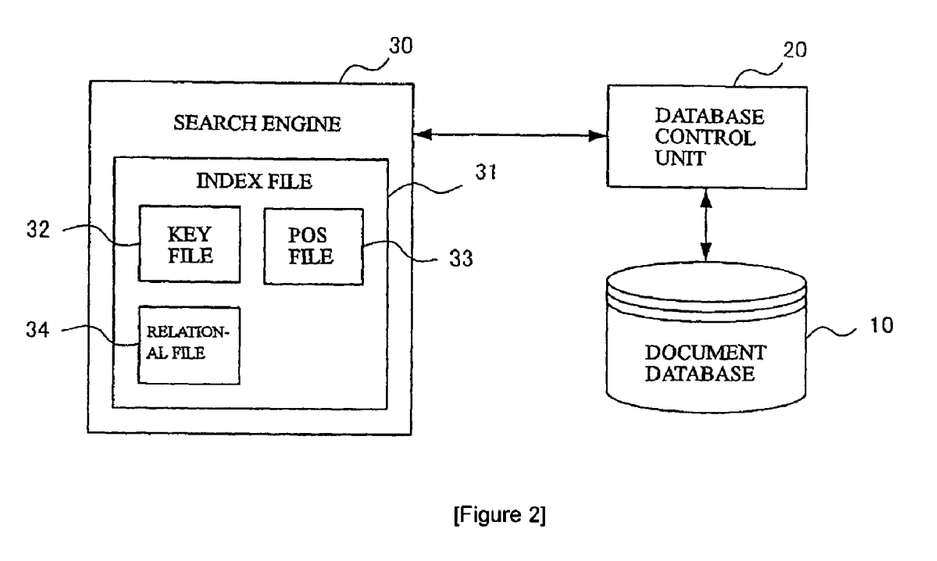
FIG. 2 shows a functional configuration of the database search system according to an embodiment of the present invention.

FIG. 2 shows a functional configuration of the database search system according to this embodiment.

With reference to FIG. 2, the database search system according to this embodiment includes a document database 10 storing document files, a database control unit 20 for controlling transfer of document files to or from the document database 10, and a search engine 30 for searching the document database 10. When the database search system according to this embodiment is implemented in the computer shown in FIG. 1, the document database 10 is implemented in the hard disk 105.

The database control unit 20 and the search engine 30 are implemented in the program-controlled CPU 101 and the main memory 103. The program for controlling the CPU 101 may be provided by distributing in the form of a magnetic disk, optical disk, semiconductor memory, or other recording media or by distributing over a network. For the computer shown in FIG. 1, the program is stored (installed) on the hard disk 105 and read into the main memory 103 so that memory is allocated to the program. The program then controls the CPU 101 and causes it to provide the above functions.

Although not specifically shown, the database search system may include input means (for example, the keyboard/mouse 110 shown in FIG. 1) for inputting a document file to be stored in the document database 10, a search expression specifying search conditions, a command for requesting search processing, and so on. The database search system may further include display means (such as a display device) for outputting a search result.

When the database search system according to this embodiment is implemented as a search server on a network such as the Internet, the input/output means may be, for example, the network interface 106 shown in FIG. 1. The network interface 106 may then receive input from a terminal connected over the network and return a search result to the terminal.

In this configuration, the document database 10 stores structured document files such as HTML documents. A stored document file describes a document separated into fields. Rules for configuring the fields depend on the language in which the document file is written. A field may include a lower field to form multiplex fields, or the entire document file may be a single field. In addition, the document structure (field configuration) may be described in various ways, such as embedding tags in the document as done in HTML documents, as well as forming a file with a combination of text data and data indicating field positions. By way of example, the following description will be given for the case where tags are used to describe the document structure.

The database control unit 20 stores document files in the document database 10 and reads out document files from the document database 10. When a desired document file is to be read out, a search expression including a search term and information specifying a field (referred to field information hereafter) is passed to the search engine 30. The search result obtained is used to locate the desired document file, which is then read out from the document database 10.

Also, at predetermined times that do not affect the readout processing of document files, the database control unit 20 reads out information for creating an index file 31 from the document database 10 and passes it to the search engine 30. The index file 31 is an information table used by the search engine 30 to search for document files. Details of operation in searching and in creating the index file 31 and details of the search expression will be described later.

The search engine 30 responds to a request from the database control unit 20 and searches the document database 10 for a document file based on the search expression. The search is performed with reference to the index file 31. The index file 31 is a data file that associates each character string (keyword) in a document file with information on the position of the character string in the document file. The index file 31 is created prior to the search processing performed by the search engine 30 and stored in, for example, the main memory 103 in FIG. 1 so that it is used in the search processing by the search engine 30.

When a document file corresponding to the search expression is found (hit), then information on the document file, that is, a document number specifying the document file and information on the position of a character string corresponding to the search term in the document file, is returned to the database control unit 20. (Of course, if a document file corresponding to the search expression is not found (not hit), a message that informs the failure of hit is returned.) Thus, the database control unit 20 can specify the desired document file and read it from the document database 10. The search processing by the search engine 30 will be described in detail later.

The index file 31 includes a key file 32 and a POS file (positional information file) 33. The key file 32 is a table that lists keywords for searching and pointers to positional information indicating positions where the keywords are located. The POS file 33 is a table that lists information specifying document files in which the keywords listed in the key file 32 are located and information on the positions of the keywords in the document files. The index file 31 is created at predetermined times that do not affect the readout processing of document files performed by the database control unit 20 and the associated search processing requested to be performed by the search engine 30. The configuration of the index file 31 will be described later in detail with reference to FIG. 7.

A high level rough process flow of a search according to this embodiment will now be described.

Figure 3A:
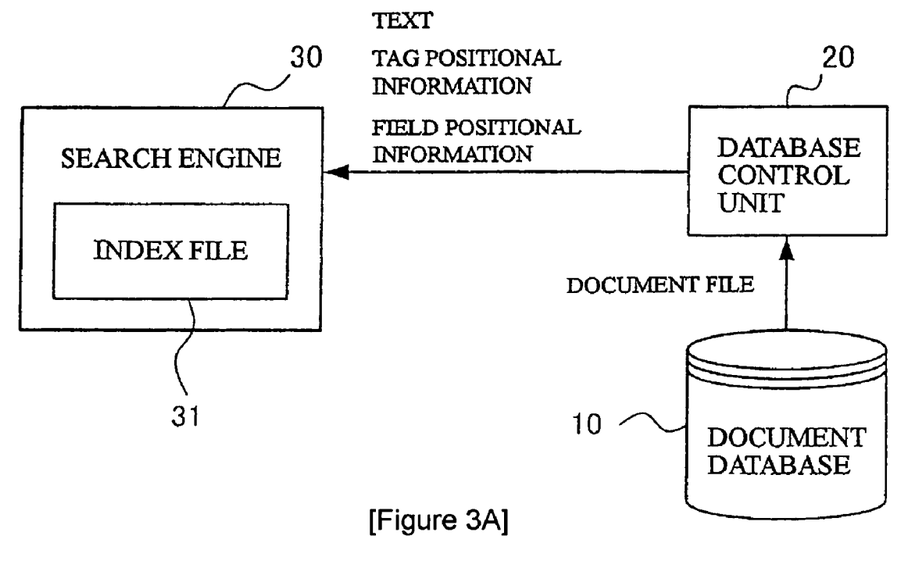
Figure 3B:
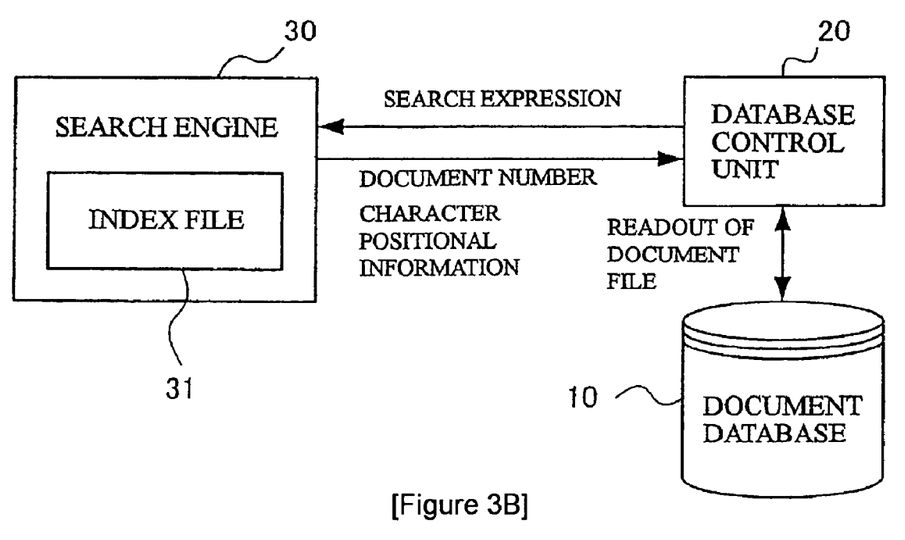

FIG. 3 shows transfer of data between the database control unit 20 and the search engine 30, wherein FIG. 3 (A) shows that in creating the index file 31, and FIG. 3 (B) shows that in searching.

For a document search, the index file 31 has to be created in advance based on information on document files to be searched for. If structured document files such as HTML documents are to be registered with the index file 31, the database control unit 20 first extracts, from each document file, document data without tags (referred to as a text hereafter) and information on the positions where the tags had appeared in the document file (see FIG. 3(A)).

At this point, unique information may be added to the original document files to facilitate retrieval of a desired document file in later searches. Each document file is assigned a unique document number, and the database control unit 20 sends the text, the tag positional information, and the document number for each document file to the search engine 30. The database control unit 20 also sends positional information on fields in each document file to the search engine 30.

The search engine 30 divides character strings in each text into words (variable-length chains) or chains of a predetermined number of characters (fixed-length chains). It then registers information indicating at what number character each chain appears in the text (character position rules) with the index file 31 along with the document number of the text.

This indexing approach is generally known as inverted indexing. The search engine 30 also converts the positional information on fields in each document file into character position rules similar to those for the chains produced by dividing in the inverted indexing and registers it. In this embodiment, this field positional information is further appended to each of these chains.

For performing search operation, the database control unit 20 first generates a search expression. A search expression includes a search term and may include field information as needed. The search expression including the field information enables a search that specifies a document file containing the search term in a desired field (for example, a document file containing the character string "日本" in its title). The field information need not be specified in the search expression when a document file containing the search term at anywhere in the document file is searched for. The generated search expression is sent from the database control unit 20 to the search engine 30 (FIG. 3(B)).

On receiving the search expression, the search engine 30 interprets the search expression and references the index file 31. It obtains the document number of a document file that meets the search expression, and the character positional information indicating at what number character a character string of the search term in the search expression appears in the text. It then returns these information items to the database control unit 20. If no document files that meet the search expression are found, a message is returned for informing that.

In this embodiment, field positional information is appended to each character string (chain) as mentioned above. This provides quick processing in searching for a specific character contained in a specific field.

The database control unit 20 receives the document number and the character positional information from the search engine 30. Based on these information items, it can read out the desired document file from the document database 10.

The search engine 30 performs a search which will now be described in more detail.

As described earlier, the search engine 30 receives a search expression including a search term and field information from the database control unit 20. It returns information to the database control unit 20, that is, a document number specifying a document file containing the search term, and information on the position in the document file of a character string corresponding to the search term. This positional information on the character string also includes information on a field in the document file. Thus, the search engine 30 also performs a field search according to the search expression.

For convenience of explanation, how to search a text of a document file for a desired character string will be described below first without mention of the field search. Then, how to perform the field search will be described.

Although any of known approaches may be used for the character string search performed by the search engine 30, this embodiment will take an exemplary approach that involves analysis using the n-gram model.

First, a description will be given of a search for a desired character string in a text written without separation between words, like a sentence in Japanese language (or in any other language based on logographic characters). In this case, the text is divided into fixed-length chains and registered with the index file 31 as keywords. This will be described below with a specific example.

Consider searching for a desired character string in the text:

明日は明日の風が吹く。

The search engine 30 registers this text with the index file 31 in the following manner.

First, the text is broken down into n-length character chains (referred to as keywords hereafter). For n=2 by way of example, the sentence 明日は明日の風が吹く。 is broken down as

明日

日は

は明

明日

日の

の風

風が

が吹

吹く

く。

The position number is set to "1" for the top keyword and incremented by one for each following keyword shifted by one character. Where the document number of this document file is "0", the pairs of (document number, position number) are represented as follows:

明日(0, 1)

日は(0, 2)

は明(0, 3)

明日(0, 4)

日の(0, 5)

の風(0, 6)

風が(0, 7)

が吹(0, 8)

吹く(0, 9)

く。(0, 10)

These keywords are sorted in order of character code (ASCII, JIS code, Unicode, etc.) as follows:

く。(0, 10)

の風(0, 6)

は明(0, 3)

が吹(0, 8)

日の(0, 5)

日は(0, 2)

明日(0, 1)

明日(0, 4)

風が(0, 7)

吹く(0, 9)

From this information, the keywords are registered with the key file 32, and the pairs of document number and position number are registered with the POS file 33. For identical keywords, only one keyword is registered with the key file 32 but a plurality of corresponding pairs of document number and position number (positional information) are registered with the POS file 33.

Figure 4:
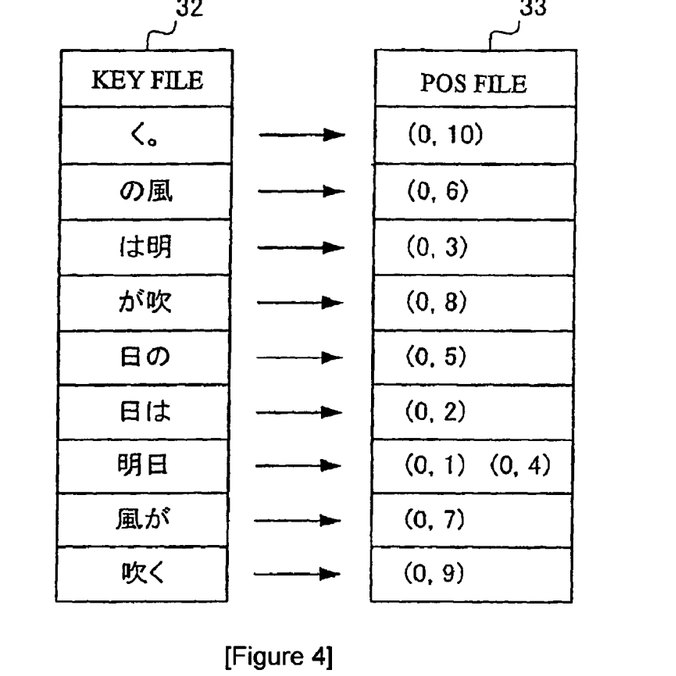
FIG. 4 shows an exemplary configuration of an index file according to an embodiment of the present invention.

FIG. 4 shows a configuration of the index file 31 for this text.

The search operation will now be described.

Suppose that a search expression including the search term "明日の風" is sent from the database control unit 20 to the search engine 30. Then, the search engine 30 begins by breaking down the search term "明日の風" into the two-character parts "明日" and "の風."

The search engine 30 obtains positional information on keywords corresponding to these parts from the index file 31. According to the index file 31 shown in FIG. 4, the positional information on the keyword "明日" is (0, 1) and (0, 4), while the positional information on the keyword "の風" is (0, 6). Taking this positional information into consideration, it can be seen that "明日" at the position (0, 4) and "の風" at the position (0, 6) is continuous. Therefore, the character string "明日の風" located at the position (0, 4) can be returned as the search result to the database control unit 20.

Now, the description will be given of a search for a desired character string in a text written with separation between words, like an English sentence. In this case, the words are variable-length character strings. If these words, which are variable-length chains, are employed as they are as keywords in the index file 31, then searching the key file 32 for a desired keyword will be difficult. Therefore, a mechanism is introduced for performing a search by breaking down a variable-length chain into fixed-length chains. This will be described below with a specific example.

Consider searching for a desired character string in the text:

"to be or not to be that is the question."

This text is registered with the index file 31 in the following manner.

The text is broken down into words simply by using a space between the character strings as a separator. Where the document number of this document is "1", the text is represented as follows:

to (1, 1)

be (1, 3)

or (1, 5)

not (1, 7)

to (1, 10)

be (1, 12)

that (1, 14)

is (1, 18)

the (1, 20)

question (1, 23)

These keywords are sorted in character-code order, and after overlapping keys are merged, they are registered with the index file 31.

Figure 5:
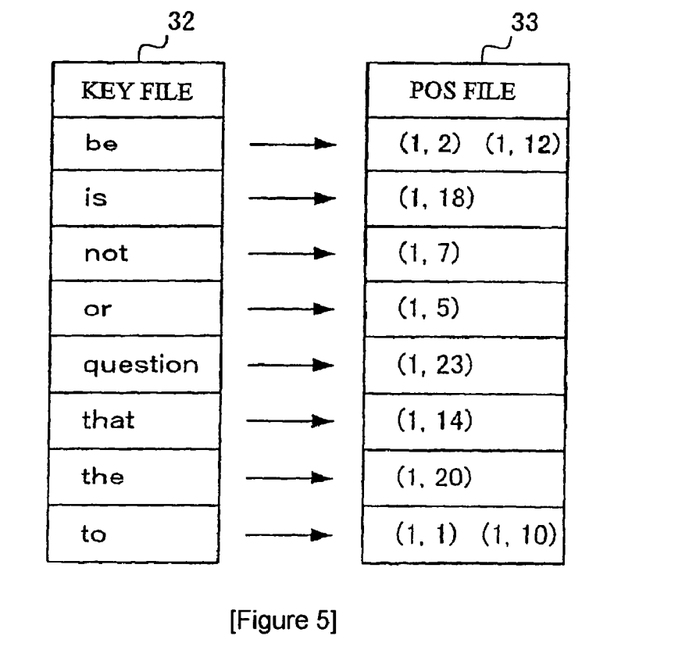
FIG. 5 shows another exemplary configuration of the index file according to an embodiment of the present invention.

FIG. 5 shows a configuration of the index file 31 for this text.

In the index file 31 for variable-length chains, a relational file 34 to be described below is further created for increased search efficiency.

First, a start mark (represented notationally as ˆ) and an end mark (represented notationally as $) are added to each word. The words with these marks are then divided into n-character parts. Where the word "question" is divided by n=3 for example, the character string "ˆquestion$" is broken down as follows:

```
^qu
que
ues
est
 sti
 tio
  ion
  on$
```

Thus, the word is represented as a set of fixed-length (n-character) keywords. Here, information corresponding to positional information (POS) on the keyword is defined as (keyword number, position number within the word). Where the keyword number of the keyword "question" is "4", information is added to the above character strings as follows:

```
^qu (4, 1)
que (4, 2)
ues (4, 3)
est (4, 4)
sti (4, 5)
tio (4, 6)
ion (4, 7)
on$ (4, 8)
```

These character strings and positional information are sorted in character-code order and registered with the relational file 34, as in the case of the key file 32 and the POS file 33.

Figure 6:
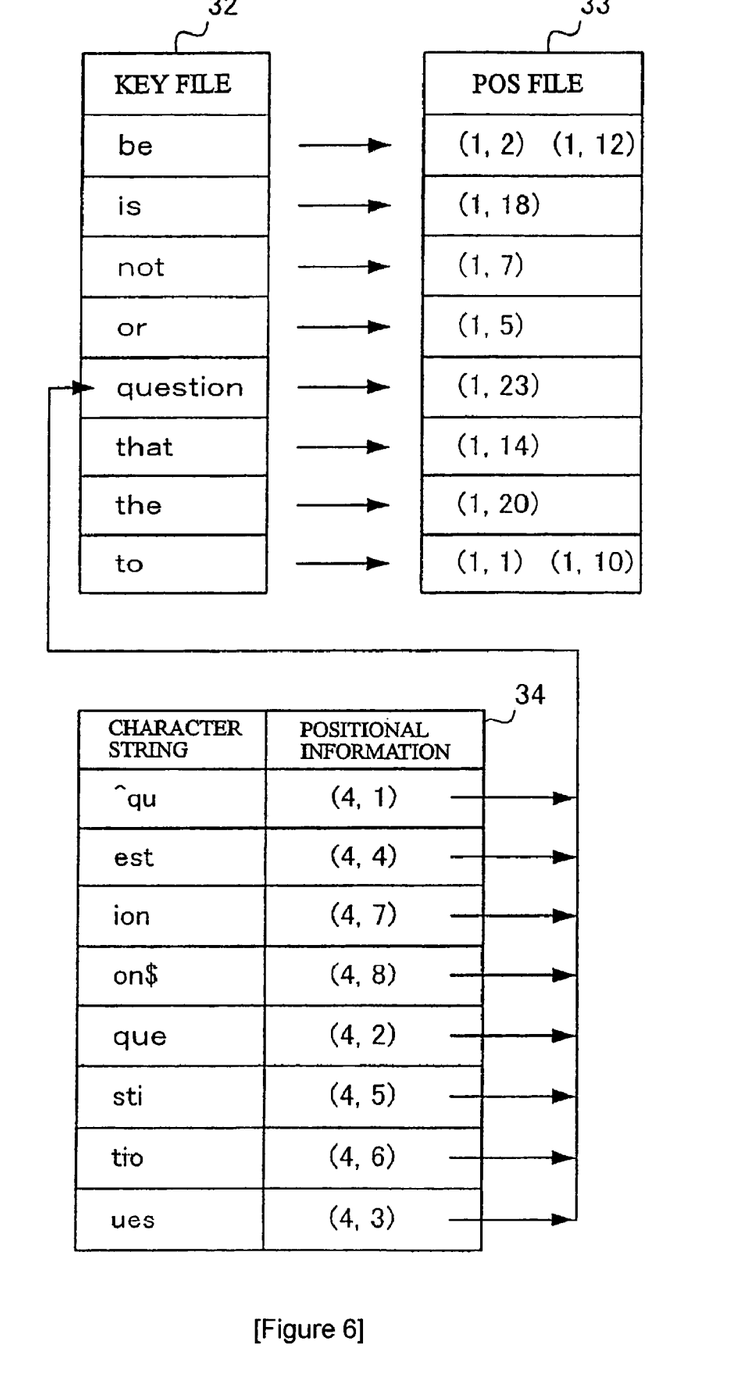
FIG. 6 shows a configuration of a relational file used for a search with a keyword of a variable-length chain and its relationship with a key file.

FIG. 6 shows a configuration of the relational file 34 for "^question$" and its relationship with the key file 32.

Next, the search operation will be described.

Suppose that a search expression including the search term "question" is sent from the database control unit 20 to the search engine 30. Then, the search engine 30 begins by breaking down "^question$", which is obtained by adding the start and end marks to the character string of the search term, into n-character chains. This results in a set of character strings as follows:

^qu
est
ion
on$

Then, the relational file 34 is referenced to find a keyword in which the character string "^qu" appears at the first character, the character string "est" at the fourth character, the character string "ion" at the seventh character, and the character string "on$" at the eighth character. In the relational file 34 for the keyword "question" shown in FIG. 6, the character string "^qu" has the positional information (4, 1), the character string "est" has (4, 4), the character string "ion" has (4, 7), and the character string "on$" has (4, 8). Therefore, the keyword with the keyword number "4" turns out to correspond to the search term "question".

Based on this search result, the key file 32 and the POS file 33 is referenced to find that the positional information on the word "question" is (1, 23). This indicates that the word corresponding to the search term appears at the 23rd character in a text of a document file with the document file number 1.

The process of performing the field search will now be described.

The noticeable characteristic of this embodiment is in this field search. Therefore, the concept of this search method according to this embodiment will be described first, and then a specific example of its operation will be described by contrast with a conventional field search method.

Figure 7:
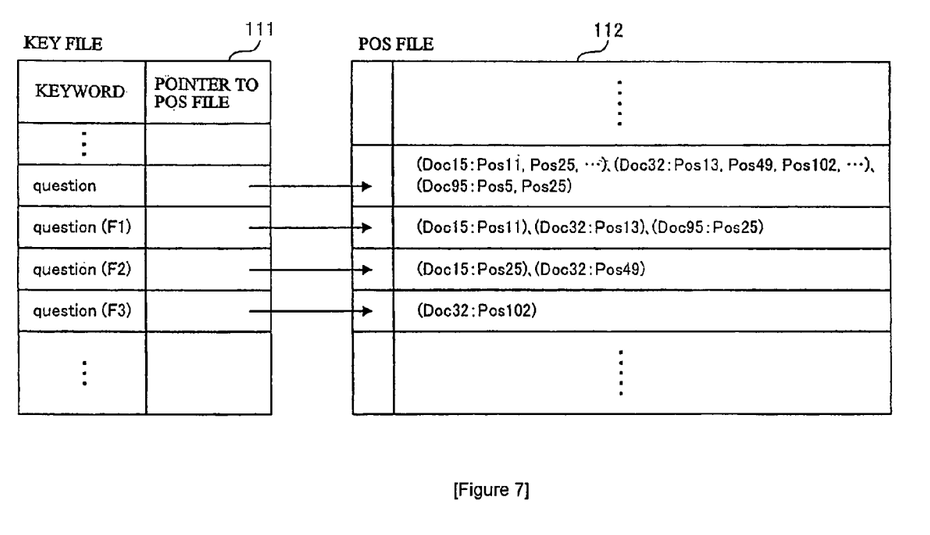
FIG. 7 describes a field search method using the index file according to an embodiment of the present invention.

FIG. 7 describes the field search method using the index file 31 according to this embodiment.

In this embodiment, for each keyword, the key file 32 lists the keyword as separate items for respective fields in which the keyword appears. In the example shown in FIG. 7, while the keyword "question" is listed by itself, "question" appearing in the field F1, "question" appearing in the field F2, "question" appearing in the field F3, and so on are listed as independent items.

The POS file 33 lists positional information for each keyword, as well as for items of the keyword for respective fields in which the keyword appears. In the example shown in FIG. 7, while positional information is listed for the keyword "question", positional information is also separately listed for "question" appearing in the field F1, "question" appearing in the field F2, and so on.

Thus, the index file 31 is configured in this manner to append the field positional information to the keywords. Therefore, when a specific character string appearing in a specific field is designated and searched for, the positional information on the desired character string can be readily obtained by referencing the POS file 33 from a corresponding item in the key file 32. In the example shown in FIG. 7, a search for "question" appearing in the field F1, for example, is performed by specifying "question" as the search term and F1 as the field. Then, the POS file 33 may be directly referenced from a corresponding item in the key file 32 to readily obtain the sets of document number and position number (Doc15, Pos11), (Doc32, Pos13), and (Doc95, Pos25).

Next, the field search operation will be described with a specific example.

Consider searching for a desired character string in the following document file.

<title>IBM software</title>

This page explains IBM software products

In this tag-structured document file, the area enclosed in <title> tags may be defined as a field 1.

First, the text "IBM software This page explains IBM software products", generated by eliminating the tags from the document file, and positional information on the <title> tags are sent from the database control unit 20 to the search engine 30. The search engine 30 registers information on this document file with the index file 31.

Where the document number of this text is "2" and keywords and their positional information are extracted in the above described manner, the following information will be registered.

IBM (2, 1)
software (2, 4)
This (2, 12)
page (2, 16)
explains (2, 20)
IBM (2, 28)
software (2, 31)
products (2, 39)

The field 1 has been defined based on the tag positions so that the start position is the keyword "IBM" and the end position is the keyword "software". This positional information is registered with the index file 31. The position number is "1" for the start position, and "12" for the end position because the end position is next to the keyword "software." Therefore, the following information will be registered for the field 1.

(FIELD 1) (2, 1), (2, 12)

Conventional search engines 30 have simply registered this positional information on the field 1 with the index file 31 along with the positional information on keywords. In contrast, this embodiment registers the information on the field 1 appended to pertinent keywords. Specifically, a keyword and a field in which the keyword appears are combined, and each keyword combined with a field is registered as an independent keyword. By this operation, the following information will be registered.

IBM (2, 1)
IBM (F1) (2, 1)
software (2, 4)
software (F1) (2, 4)
This (2, 12)
page (2, 16)
explains (2, 20)
IBM (2, 28)
software (2, 31)
products (2, 39)

These are sorted in character-code order, and after overlapping keywords are merged, these are registered with the index file 31.

Figure 8:
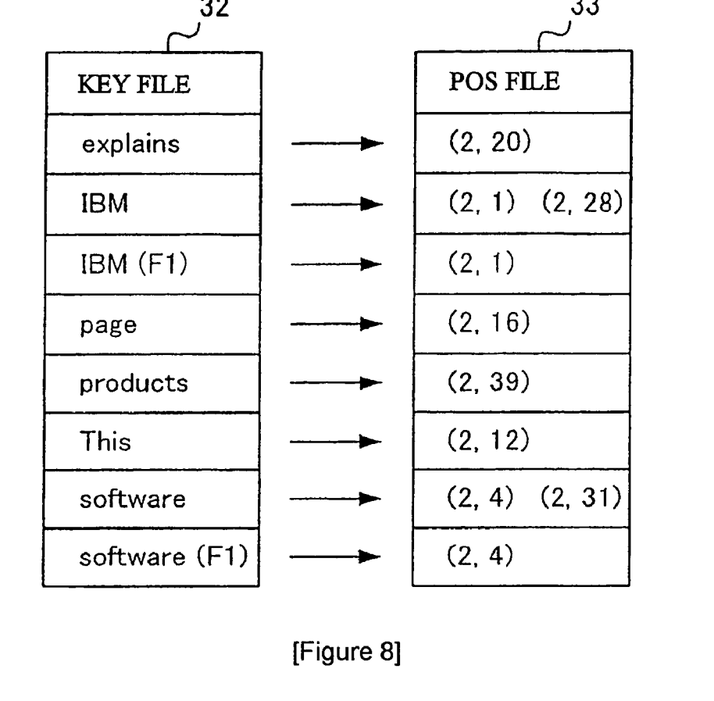
FIG. 8 shows a still another exemplary configuration of an index file according to an embodiment of the present invention.

FIG. 8 shows a final configuration of the index file 31 for this document file provided according to this embodiment.

Figure 9:
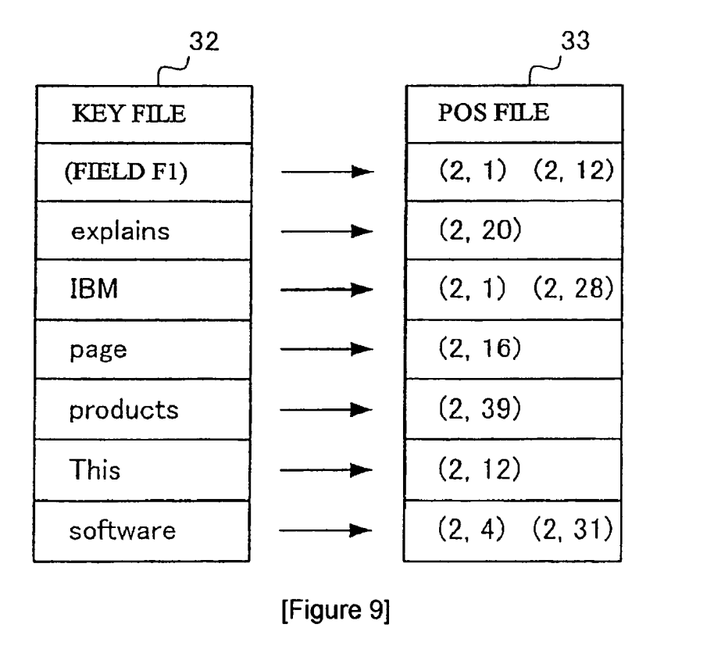
FIG. 9 shows a configuration of a conventional index file obtained for the same document file as in FIG. 8.

Also, FIG. 9 shows a configuration of a conventional index file 31 for this document file.

As described, the field positional information has been conventionally registered with the index file 31 in the same manner as the keyword positional information. That is, information specifying a field has been registered with the key file 32, and the positional information on the field has been registered with the POS file 33. In the example shown in FIG. 9, the name of the field 1 (FIELD 1) is registered with the key file 32, and its positional information (2, 1), (2, 12) is registered with the POS file 33. Keywords are sorted as usual in character-code order, and registered after overlapping keywords are merged.

Next, the search operation will be described.

Suppose that a search expression is written in the format "search term @ field", and the search expression "IBM @ F1" has been sent from the database control unit 20 to the search engine 30. That is, a document file containing the word "IBM" in the field F1 is searched for. In this case, the search engine 30 first references the relational file 34 to obtain the keyword "IBM" corresponding to the search term. Then, it searches for a registered item "IBM (F1)", which is a combination of the keyword "IBM" and the field F1.

Since the key file 32 in the index file 31 shown in FIG. 8 includes the corresponding registered item "IBM (F1)", its positional information registered with the POS file 33 is directly referenced. This provides only the positional information (2, 1) as the search result, which is returned to the database control unit 20.

The database control unit 20 reads out a document file with the document number 2 from the document database 10 based on the positional information (2, 1) obtained for the search expression "search term @ field".

On the other hand, when a search is performed with reference to the conventional index file 31 shown in FIG. 9, positional information registered with the POS file 33 is referenced from the keyword "IBM" corresponding to the search term. Similarly, for the field F1 in the search expression, information on the field F1 registered with the POS file 33 is referenced from the key file 32. Then, these information items are matched to search for a document including the keyword "IBM" appearing in the field F1.

Specifically, attention is focused first on the positional information (2, 1) on the keyword "IBM", and it is matched with the positional information on the field F1. Because the field F1 begins at (2, 1) and ends at (2, 12), the keyword "IBM" with the positional information (2, 1) meets the search expression. Next, attention is focused on the positional information (2, 28). However, because it is out of the definition of the field F1, the keyword "IBM"with the positional information (2, 28) does not meet the search expression. Therefore, only the positional information (2, 1) is obtained as the search result, which is returned to the database control unit 20.

Thus, as shown in FIG. 8, the search engine 30 according to this embodiment has the field information appended to the keywords and registered with the key file 32 and POS file 33 in the index file 31. Once a keyword corresponding to a search expression (and therefore matching the field information) is obtained, what is required is only obtaining the positional information on the keyword from the POS file 33; it is not required to match the keyword positional information with the field positional information. Therefore, a significant reduction in time required for a search involving a field search can be expected compared to the conventional system using an index file 31 shown in FIG. 9.

In the above described search operation, the relational file 34 is not configured to accommodate keywords independent for each field. Rather, a keyword without field information is searched for in the relational file 34 first, and then a registered item for the keyword combined with field information is searched for. Therefore, even though keywords combined with their field information are registered independently with the key file 32, it does not affect the configuration of the relational file 34, and therefore does not increase the time required for a search.

Because the registered keywords have been sorted in character-code order in the search file 31, keywords combined with their field information are listed near an identical keyword without field information. Therefore, even though a keyword without field information is obtained first and then the key file 32 is searched for the keyword combined with field information, it does not require so much time as to affect the overall processing.

Further, when keywords are fixed-length chains as in the case of a search with a Japanese search term, there is no mechanism for obtaining a keyword corresponding to the search term with reference to the relational file 34. This may mean that the time required for searching for a keyword corresponding to a search term increases, because registered information in the key file 32 has increased due to keywords combined with field information.

However, processing for matching the keyword positional information and the field positional information has been eliminated; this decrease in processing amount significantly affects the overall search processing further than the increase in processing amount due to the increased registered data in the key file 32. Therefore, the decrease contributes to providing quicker search processing.

The above embodiment has been described for an exemplary configuration in which the database search system is implemented in a single computer. However, the system according to the present invention is not limited to this hardware configuration.

The document database 10 may be built on a different computer connected over a network, and/or the database control unit 20 and the search engine 30 may be distributed as functions of separate computers connected over a network.

It is to be understood that the specific embodiments of the invention that have been described are merely illustrative of certain applications of the principle of the present invention. Numerous modifications may be made to the system, method, and service for providing quick search processing in a document database search involving a field search described herein without departing from the spirit and scope of the present invention.

What is claimed is:

1. A processor-implemented database search system, comprising:
   a database for storing a document file;
   a database control unit for controlling a transfer of a document file to and from said database;
   a search engine for searching said database on the basis of a keyword comprised of a character string, and for returning a search result to said database control unit;
   an index file for use in a search process by means of said search engine, for retaining information indicating a correspondence of said keyword to positional information of the keyword, based on a field in the document file that includes said keyword;
   wherein the index file comprises a key file that includes a list of pointers to character strings and positional information;
   wherein the character strings are included in the document file and are stored in the database by document area where a character string in the document file appears and by a positional information file;
   wherein the positional information file includes a list of positional information containing information that specifies the document file where a character string exists and information that specifies a position of the character string in the document file regarding the character string in the key file; and
   wherein for a variable-length chain included in the index file, a relational file is created by dividing each word in the variable-length chain into a plurality of fixed-length keywords.

2. The database search system according to claim 1, wherein the database control unit reads the document file from the database, and extracts a text of the document file and information indicating a structure of the document file, to send the text and the information to the search engine; and
   the search engine creates the index file based on the text and the information indicating the structure of the document file received from the database control unit.

3. The database search system according to claim 1, wherein the index file retains, as the positional information on the keyword, information that identifies the document file containing the keyword and information that specifies a position of the keyword in the document file, each item of the positional information being associated with a corresponding item of the keyword listed as a separate item for a respective field.

4. The database search system according to claim 1, wherein the index file comprises:
   a first table that lists character strings contained in the document file stored in the database and pointers to positional information on the character strings, each character string being listed as a separate item for respective fields where the character string appears in the document file; and
   a second table that lists positional information on each character string including the character strings listed in the first table, said positional information including information that identifies the document file containing the character string and information that specifies a position of the character strings in the document file.

5. A processor-implemented computer program product being exacutable by a processor for use in searching database, comprising:
   database control means for controlling the transfer of a document file to and from a database; and
   search means for referencing the index file retaining information that specifies a document file which includes a keyword containing a character string and information indicating a correspondence to the keyword according to a field in the document file, the document file including the keyword and transmitting information specifying the document file where the character string appears in the field to the database control means;
   wherein the index file comprises a key file that includes a list of pointers to character strings and positional information;
   wherein the character strings are included in the document file and are stored in the database by document area where a character string in the document file appears and by a positional information file;
   wherein the positional information file includes a list of positional information containing information that specifies the document file where a character string exists and information that specifies a position of the character string in the document file regarding the character string in the key file; and
   wherein for a variable-length chain included in the index file, a relational file is created by dividing each word in the variable-length chain into a plurality of fixed-length keywords.

6. A computer program product being executable by a processor having a plurality of executable instruction codes stored on a computer-usable medium, for use in searching a database, comprising:
   a set of instruction codes for receiving an input of a search expression that contains a search term made of a given character string and field information specifying a field in a document file where the search term appears;
   a set of instruction codes for referencing an index file stored in memory and retaining information indicating a correspondence of information that specifies said document file to the keyword according to a field in said document file;
   a set of instruction codes for specifying a keyword corresponding to said search expression that comprises said field information;
   a set of instruction codes for acquiring information specifying a document file including the specified keyword; and
   a set of instruction codes for outputting the information acquired by referencing said index file as a search result;
   wherein the index file comDrises a key file that includes a list of pointers to character strings and positional information;
   wherein the character strings are included in the document file and are stored in the database by document area where a character string in the document file aroears and by a positional information file;

wherein the positional information file includes a list of positional information containing information that soecifies the document file where a character string exists and information that srecifies a position of the character string in the document file regarding the character string in the key file; and wherein for a variable-length chain included in the index file, a set of instruction codes creates a relational file by dividing each word in the variable-length chain into a plurality of fixed-length keywords.

7. The computer program product according to claim 6, further comprising:

a set of instruction codes for reading the document file from the database;

a set of instruction codes for extracting a text of the document file and information indicating a structure of the document file, to send the text and the information to a set of instruction codes for executing the search expression; and a set of instruction codes for executing the search expression creating the index file based on the text and the information indicating the structure of the document file.

8. The computer program product according to claim 6, wherein the index file retains, as positional information on the keyword, information that identifies the document file containing the keyword and information that specifies a position of the keyword in the document file, each item of the positional information being associated with a corresponding item of the keyword listed as a separate item for a respective field.

9. The computer program product according to claim 6 wherein the index file comprises:

a first table that lists character strings contained in the document file stored in the database and pointers to positional information on the character strings, each character string being listed as a separate item for respective fields where the character string appears in the document file; and a second table that lists positional information on each character string including the character strings listed in the first table, said positional information including information that identifies the document file containing the character string and information that specifies a position of the character strings in the document file.

10. The computer program product according to claim 5, further comprising:

means for reading the document file from the database;

means for extracting a text of the document file and information indicating a structure of the document file, to send the text and the information to a set of instruction codes for executing the search expression; and means for executing the search expression creating the index file based on the text and the information indicating the structure of the document file.

11. The computer program product according to claim 5, wherein the index file retains, as positional information on the keyword, information that identifies the document file containing the keyword and information that specifies a position of the keyword in the document file, each item of the positional information being associated with a corresponding item of the keyword listed as a separate item for a respective field.

12. The computer program product according to claim 5, wherein the index file comprises:

a first table that lists character strings contained in the document file stored in the database and pointers to positional information on the character strings, each character string being listed as a separate item for respective fields where the character string appears in the document file; and a second table that lists positional information on each character string including the character strings listed in the first table, said positional information including information that identifies the document file containing the character string and information that specifies a position of the character strings in the document file.

* * * * *